United States Patent [19]
Zhou et al.

[11] Patent Number: 6,084,922
[45] Date of Patent: Jul. 4, 2000

[54] WAITING CIRCUIT

[75] Inventors: Changming Zhou; Xuping Zhou; Guoliang Shou, all of Tokyo, Japan

[73] Assignee: Yozan Inc., Tokyo, Japan

[21] Appl. No.: 09/061,097

[22] Filed: Apr. 16, 1998

[30] Foreign Application Priority Data

Apr. 17, 1997 [JP] Japan ................................. 9-114212

[51] Int. Cl.⁷ ................................................. H04L 27/06
[52] U.S. Cl. .......................... 375/316; 375/340; 375/343; 375/365; 455/343
[58] Field of Search .................... 375/316, 343, 375/340, 365, 366; 455/343

[56] References Cited

U.S. PATENT DOCUMENTS 5,799,010  8/1998  Lomp et al. ......................... 375/208

Primary Examiner—Tesfaldet Bocure
Attorney, Agent, or Firm—Pillsbury Madison & Sutro LLP

[57] ABSTRACT

A waiting circuit which is utilized in a mobile communication system. The waiting circuit detects a predetermined signal from a base station. The waiting circuit starts other circuits in the mobile communication system which are in a sleep mode when the predetermined signal is received. The predetermined signal is generated in the base station. The predetermined signal has a speed equal to a predetermined symbol rate and is modulated to be an intermediate frequency signal. The intermediate frequency signal is sampled in response to a sampling clock that has a speed equal to an integer times the symbol rate. The sampled intermediate frequency signal is input to a match filter which multiplies the sample signal by a predetermined sequence of coefficients.

16 Claims, 11 Drawing Sheets

To the matched filter, judgment circuit, MUX, start signal generating circuit and saving signal generating circuit.

Truth Table of the Multi-plexer MUX1

| UW flag | CI flag | DATA1 flag | DATA2 flag | DATA2 CTL | MUX1 output |
|---|---|---|---|---|---|
| 0 | 0 | 0 | 0 | × | UW coefficient |
| 1 | 0 | 0 | 0 | × | CI coefficient |
| 1 | 1 | 0 | 0 | × | DATA1 coefficient |
| 1 | 1 | 1 | 0 | × | DATA2 coefficient |
| others | | | | | invalid |

Truth Table of the Multi-plexer MUX1

| UW flag | CI flag | DATA1 flag | DATA2 flag | DATA2 CTL | Start signal "2" |
|---------|---------|------------|------------|-----------|------------------|
| 1 | 1 | 1 | 1 | 1 | 0 |
| 1 | 1 | 1 | × | 0 | 0 |
| others | | | | | 1 |

×: arbitrary

Truth Table of the Multi-plexer MUX1

| clk counter | DATA2 CTL | Start signal "1" | start signal "2" | saving signal |
|---|---|---|---|---|
| UW timig | × | 1 | 1 | 0 |
| CI timing | × | 1 | 1 | 0 |
| DATA1 timing | × | 1 | 1 | 0 |
| DATA2 timing | 1 | 1 | 1 | 0 |
| × | × | 0 | × | 0 |
| × | × | × | 0 | 0 |
| others | | | | 1 |

6,084,922

WAITING CIRCUIT

BACKGROUND OF THE INVENTION

1. Field of the Invention

The present invention relates to a waiting circuit for a portable terminal of a mobile and personal cellular system such as personal handy-phone system (PHS).

2. Background of the Invention

Recently, the use of a personal handy-phone system (PHS), the personal digital cellular (PDC) and other personal mobile and cellular systems have greatly expanded. A waiting reception mode is usually employed in order to decrease the electrical power consumption, because power consumption is one of the most important factors to consumers other than size and the light weight.

The PHS system, uses a multi-carrier 4-time-slots-division-multiple-access (4-TDMA), a transfer manner of time-division-duplex (TDD) and a modulation manner of $\pi/4$ shift quadrature-phase-shift-keying (QPSK), so each of the users communicates through a time slot different from the other users' time-slots. When not in the communication mode, the portable terminal is set in a sleep-mode in which electrical power is intermittently supplied, for example every 1.2 seconds only to a waiting circuit which detects whether there is a message for the terminal. Other circuits are sleeping or are stopped by stopping the power supply to the circuits. The waiting circuit generates start signal when a message is found so that the electrical power is supplied to other circuits for receiving the message. When no message is detected, the sleep-mode is continued.

FIG. 12 shows a conventional portable terminal, in which there is a waiting circuit 100, a receiver 110 for converting a signal received by an antenna into a intermediate frequency signal, a demodulator 120 for demodulating an output from the receiver 110, a TDMA controller 130 for receiving an output from the demodulator 120, a CPU 140 for controlling the total circuits including the above TDMA controller 130, a detector 101 for detecting a message to the terminal from the intermediate frequency signal and a waiting control circuit 102 for generating the start signal to the TDMA controller 130 and the CPU 140 in response to an output from the detector 101.

When in a sleep-mode, the electrical power is supplied in predetermined time intervals to the receiver 110 and the waiting circuit 100 for detecting a message to the terminal by detector 101. When no message is detected, the circuits 100 and 110 are cut off from the power supply and place in the sleep mode again. When a message is detected, the circuit 102 generates a start signal for supplying the electrical power to the circuits 120, 130 and 140 so that the message can be received. However, the waiting circuit 100 continues in the sleep-mode when the message is not received.

FIG. 13 shows a conventional waiting circuit 100 using a matched filter 104. The matched filter 104 calculates a correlation between the demodulated signal and a coefficient identical to the terminal. The waiting circuit 100 includes a demodulator 103 for demodulating the intermediate frequency signal from the receiver 110 into a baseband signal and for outputting the demodulated signal to the matched filter 104. The matched filter 104 outputs the correlation results to a judgment portion 105 which judges whether the correlation result is higher than a threshold or not and outputs an output when higher. The waiting control circuit 102 outputs the start signal when the correlation is higher.

The message can be quickly detected because of the matched filter 104. However, a demodulator is necessary. A demodulator is large in size and consumes a lot of electric power. If the demodulator were omitted by directly inputting the output from the demodulator 120 to the matched filter 104, the demodulator 120 must always be supplied with power. This would cause a substantial amount of power to be consumed.

SUMMARY OF THE INVENTION

The present invention solves the above mentioned problems by providing a waiting circuit that is small in size and consumes little power.

The waiting circuit according to the present invention has a frequency converter for converting the intermediate frequency signal from the receiver into the second intermediate frequency. The second frequency signal is directly processed by the matched filter, so the demodulator in the conventional waiting circuit is deleted.

PREFERRED EMBODIMENT OF THE PRESENT INVENTION

Figure 1:
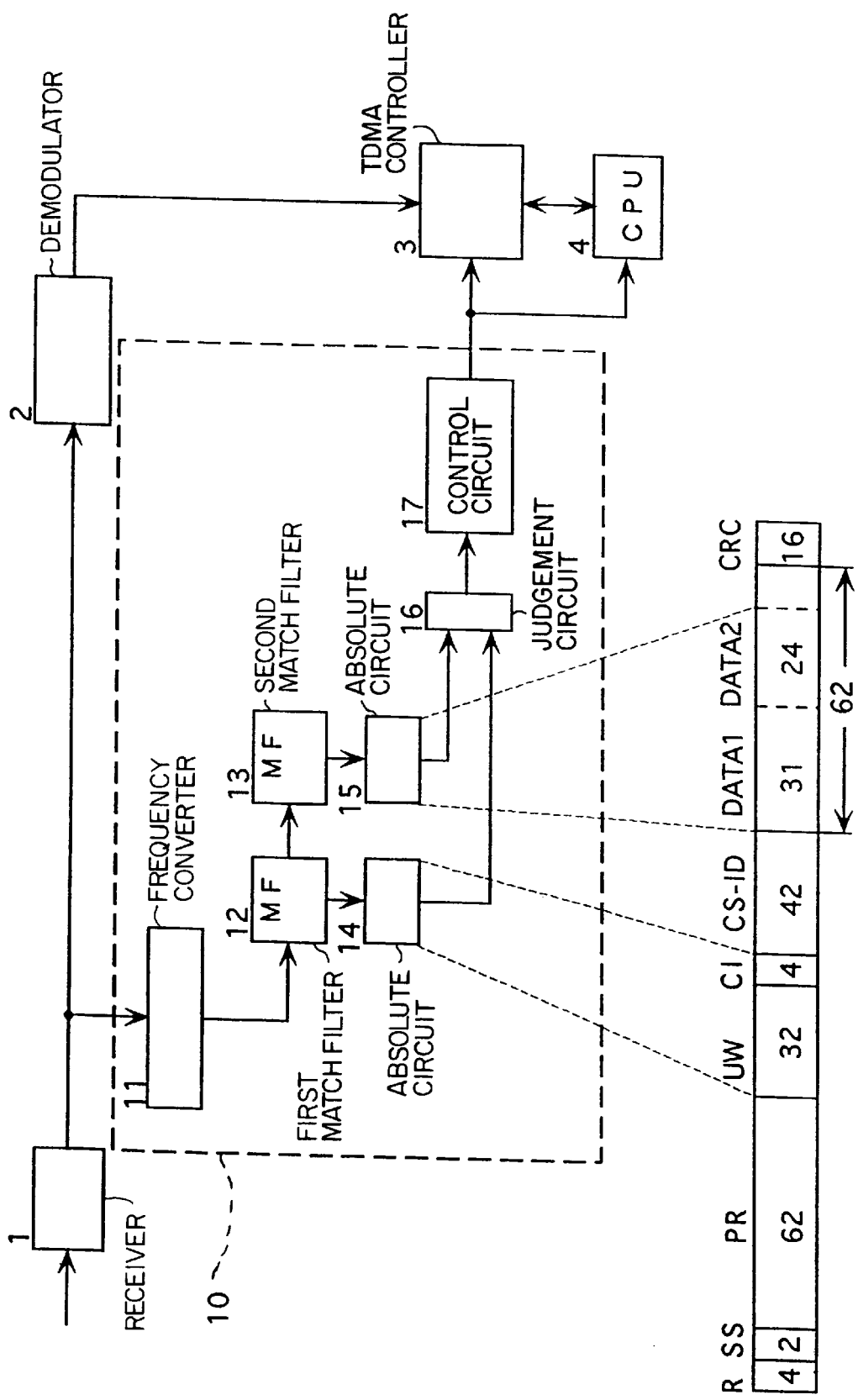
FIG. 1 is a block diagram of an embodiment of the waiting circuit according to the present invention.

FIG. 1 is a block diagram showing a waiting circuit according to the present invention.

In FIG. 1, a portable terminal has a waiting circuit 10, a receiver 1 for converting a signal received by an antenna into a hard-limited intermediate frequency (IF) signal, a demodulator 2 for demodulating an output from the receiver 1, a TDMA controller 3 for receiving an output from the demodulator 2, and a CPU 4 for controlling the total circuits including the above TDMA controller 3. The intermediate frequency signal output from the receiver 1 is a square wave with a frequency of for example 10.8 MHz. The hard-limited IF signal is substantially a square wave of binary levels.

In the waiting circuit 10, the IF signal is input to a frequency converter 11 for converting the IF signal into a second intermediate frequency signal of a lower frequency such as 1.2 MHz. The first IF signal from the receiver is substantially a binary signal but may include high level bits of not sufficiently high levels. The frequency converter 11 further amplifies the IF signal so that second IF signal becomes a pure binary signal due to raised levels. The second intermediate signal is input to the first and second matched filters 12 and 13 for calculating correlation of the second IF signal to the first coefficient and the second coefficient, respectively. The first matched filter 12 detects a data of unique word UW and channel identification CI common to the total users, and the second matched filter detects an information data to be extracted. The outputs of the matched filters 12 and 13 are input to absolute circuits 14 and 15 for calculating absolute values of the outputs. The absolute values are input to a judgment circuit 16 for judging whether the absolute values are bigger than a threshold. The result of the judgment is input to a control circuit 17 for controlling the TDMA controller 3 and CPU 4.

The terminal of PHS system receives a paging channel (PCH) transmitted from a control channel of a base station and detecting a signal calling the terminal. The PCH channel consists of a plurality of PCH slots each of which consists of a 4-bits time R of burst transient response, a 2-bits start symbol S of "10", a 62-bits preamble PR, the UW of 32-bits, the CI of 4-bits, a cell station identification code CS-ID, a 62-bits PCH information portion and a 16-bits CRC portion, as shown in FIG. 1. The time R is provided for smoothing leading and trailing edges of a burst transmit signal. The start symbol indicates a start of a burst information, and the preamble for bit synchronization between the base station and the terminal by reproducing a clock signal in the received signal. The UW is used for establishing a word synchronization of the burst signal, and the CI indicates what kind of slot the slot is. The CS-ID is uniquely allocated to each base station for distinguishing each base station from others. So, UW and CI are fixed. The PCH information portion consists of a 32-bits first information portion DATA1 and a 24-bits second information portion DATA2. The DATA1 includes a 3-bits information indicating a calling service type and a 28-bits personal station number PS. The DATA2 includes various information of 24-bits.

The conventional demodulation circuit is not necessary for this embodiment because the IF signal from the receiver 1 is directly input to the matched filter without demodulation. The input signal to the matched filters 12 and 13 is converted in frequency by multiplying the IF signal by a signal having a frequency equal to a difference between the first and second intermediate frequencies. Since the first intermediate frequency signal has a rather low level of about Vpp=0.3 V, the frequency converter amplifies the first IF signal up to about Vpp=3.0 V. The matched filters multiplies the second intermediate signal by coefficients for subsampling. The signals are directly extracted by the subsampling without demodulation. Therefore, the circuit size as well as the power consumption are decreased.

In the above description, there are two matched filters for predetermined data and variable information data; respectively. However, a plurality of matched filters may be independently provided for the parameters UW, CI, DATA1 and DATA2, respectively.

The following embodiment is the case that the matched filters are independently provided for these parameters.

Figure 2:
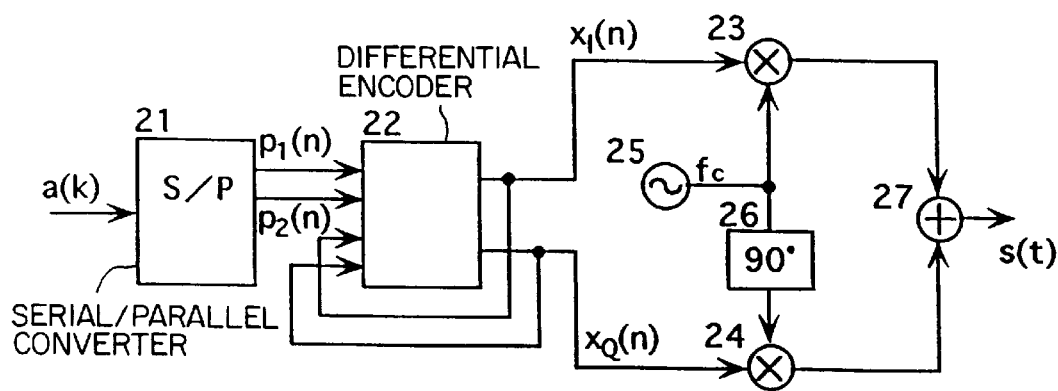
FIG. 2(a) is a circuit diagram of a transmitter for $\pi/4$-shift QPSK.
FIG. 2(b) is a block diagram of a receiver for correlation according to the present invention.
Figure 2:
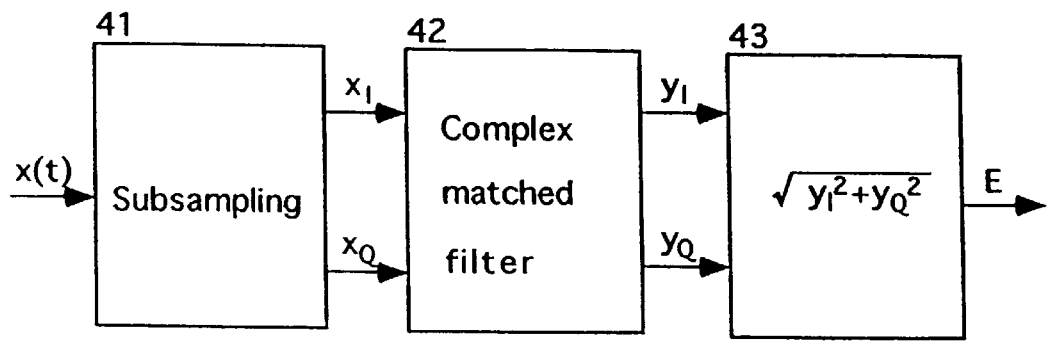

FIG. 2(a) shows a transmitter having a modulation manner of π/4-shift QPSK. The transmitter includes a serial/parallel converter 21, a differential encoder 22, a multiplier 24, a carrier generator 25, a π/2 phase-shifter 26 and an adder 27.

A serial input signal a(τ) of a function of discrete time sequence τ is separated by the serial/parallel converter into two signal sequences p1(2u−1) and p2(2u), where τ=2u−1, 2u. Then, an encoded signal xI(2u−1) and xQ(2u) of π/4-shift QPSK are generated by the encoder 22, as follows.

$$xI(u) = \cos \emptyset(u) \tag{1}$$

$$xQ(u) = \sin \emptyset(u) \tag{2}$$

$$\emptyset(u) - \emptyset(u-1) = \Delta(u) \tag{3}$$

A relationship between $\Delta(u)$ and combinations of p1(u) and p2(u) is predetermined for example as shown in the following Table 1.

TABLE 1

Relationship between $\Delta(u)$ and Combinations of p1(u) and p2(u)

| p1(u) | 0 | 0 | 1 | 1 |
|---|---|---|---|---|
| P2(u) | 0 | 1 | 0 | 1 |
| $\Delta$(u) | π/4 | −π/4 | 3 π/4 | −3 π/4 |

The relationship is represented by a function Rule($\Delta$(u), p1(u), p2(u)), the equations (1) and (2) can be expressed also by the equations (4) and (5), respectively.

$$xI(u) = \cos\{\text{Rule}(\emptyset(u-1), p1(u), p2(u))\} \tag{4}$$

$$xQ(u) = \sin\{\text{Rule}(\emptyset(u-1), p1(u); p2(u))\} \tag{5}$$

xI(u) and xQ(u) are transmitted at a symbol period of Ts, so they can be expressed by a continuous function of time "t", when the discrete time "u" is represented by a rectangle wave of a duration time Ts. Here, xI(u) and xQ(u) are substituted by such functions xI(t) and xQ(t).

A transmission signal s(t) is generated by modulating xI(t) and xQ(t) with a carrier wave of frequency fc, and by adding them together according to the equation (6).

$$s(t) = xI(t) \cdot \cos(2\pi \cdot fc \cdot t) - xQ(t) \cdot \sin(2\pi \cdot fc \cdot t) \tag{6}$$

A receiver receives a signal corresponding to s(t) of a radio frequency, and converts the signal into the first intermediate frequency. The frequency converter 11 converts the signal into the second intermediate frequency IF. For example, the first intermediate frequency is 10.8 MHz and the second intermediate frequency is 1.2 MHz. The second intermediate signal (IF signal, hereinafter) x(t) is input to the matched filter 12. The first intermediate frequency signal is a rectangle wave of 0.3 Vp-p generated by hard-limiting. The second intermediate signal has a range between 0 V and 3 V due to amplification of the first signal.

In the matched filter 12 shown in FIG. 2(b), the signal x(t) is input to a sub-sampling circuit 41 along a continuous time t. In the sub-sampling circuit 41, a double-sampling of the symbol rate Ts is performed, one sampling is for xI(t) and the other is for xQ(t). The sampling is expressed in the equations (7) and (8) of functions of discrete integer "i", under an ideal condition.

$$x'I(i) = \cos(2\pi \cdot f_{IF} \cdot Ts \cdot I + \emptyset(i)) \tag{7}$$

-continued $$x'Q(i) = \sin(2\pi \cdot f_{IF} \cdot Ts \cdot i + \varnothing(i)) \quad (8)$$

$$= \cos\left(2sr \cdot f, F \cdot \left(Ts - \frac{1}{4f_{IF}}\right) \cdot i + \varnothing(i)\right)$$

where, $i$ is a series of integer.

In the equations (7) and (8); the terms in the bracket are simplified as follows.

$$x'I(i) = \cos(2\pi \cdot \Delta f \cdot i + \varnothing(i)) \quad (9)$$

$$x'Q(i) = \sin(2\pi \cdot \Delta f \cdot i + \varnothing(i)) \quad (10)$$

where, $$\Delta f = \mathrm{Mod}\left(f_{IF}, \frac{1}{Ts}\right) \quad (11)$$

The signals x'I(u) and x'Q(u) are "pseudo-baseband" signals corresponding to the baseband signals but different from them, which are input to a complex matched filter 42. The matched filter 42 has a pair of series of multiplication circuits for x'I(u) and x'Q(u), respectively. The coefficient sequences mI(i) and mQ(i) (i=1 to M) of the series of multiplication circuits for x'I(u) and x'Q(u) are determined as follows. Here, "M" is number of taps of each matched filter.

$$mI(i) = \cos(2\pi \cdot \Delta f \cdot i + \varnothing(i)) \quad (12)$$

$$mQ(i) = \sin(2\pi \cdot \Delta f \cdot i + \varnothing(i)) \quad (13)$$

$$i=1 \text{ to } M \quad (14)$$

Then, the correlation matched filter 42 outputs a correlation yI and yQ corresponding to xI(u) and xQ(u) transmitted. The correlations yI and yQ are input to an absolute circuit 43 for calculating an absolute value E.

$$yI = \sum_{i=1}^{M} \{mI(i) \cdot x'I(i) + mQ(i) \cdot x'Q(i)\} \quad (15)$$

$$yQ = \sum_{i=1}^{M} \{-mI(i) \cdot x'Q(i) + mQ(i) \cdot x'I(i)\} \quad (16)$$

$$E = \sqrt{yI^2 + yQ^2} \quad (17)$$

The judgment circuit 16 judges whether the absolute value is higher than a predetermined threshold, in order to determined whether the signal is received or not.

When the receiver is in a sleep mode, the control channel is received and the absolute value is calculated intermittently, for example every 1.2 sec. When judged to be received, PCH channel is received.

The sampling manner of the sub-sampling circuit 41 may be quadruple sampling for reducing the influences of noise and distortion of received signal.

After the judgment of the matched filter 12, the second matched filter 13 judges whether the information portions DATA1 and DATA2 are transmitted for the portable terminal itself. The matched filter 13 calculates a correlation between the information portions and predetermined series of coefficients. An absolute value of the correlation is calculated by the absolute circuit 15. The judgment circuit 16 judges whether the absolute value is higher than a threshold or not. When it is higher, it is judged that a message is included within the PCH slot so that a start signal is generated by the control circuit 17. Then, other circuits than the waiting circuit are started to work, while the waiting circuit 10 enters a sleep mode.

If the judgment circuit 16 does not end UW, CI or DATA1 and DATA2 for the portable terminal itself, the waiting circuit 10 enters the sleep mode again.

Concerning the judgment of DATA1 and DATA2, the start signal may be generated when both of them are detected or when one of them is detected. The judgment circuit is changeable in judgment mode.

The control circuit 17 counts the outside saving signal until the circuit detects UW so as to judge whether the synchronization is completed. When the counted number reach a predetermined value and the synchronization can not be confirmed, the control circuit 17 generates another start signal to restart synchronization of the above start signal.

Figure 3:
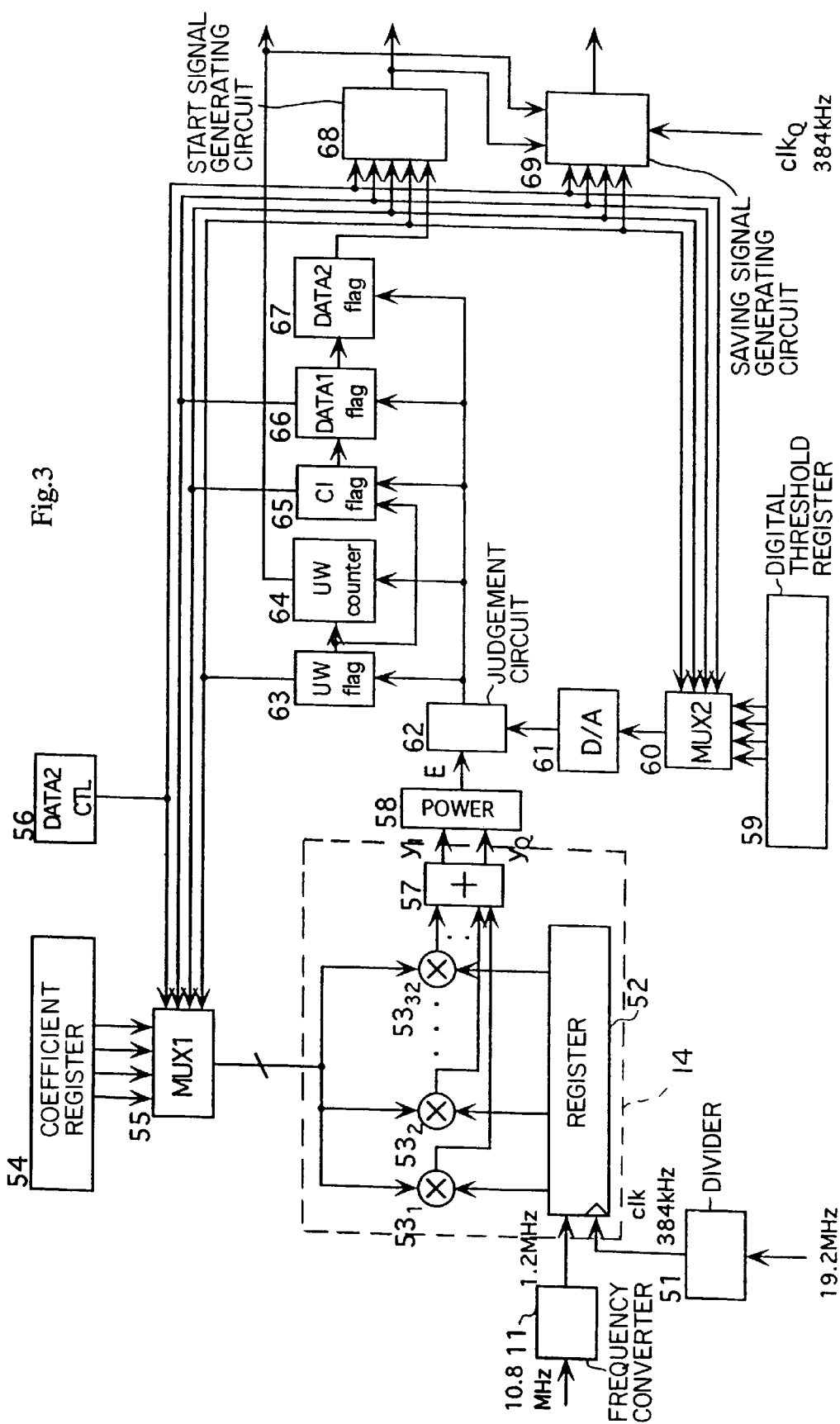
FIG. 3 is a block diagram of another embodiment of the waiting circuit.

The second embodiment in FIG. 3 has only one matched filter for detecting all of UW, CI, DATA1 and DATA2 with a plurality of sequences of coefficients selectable. This waiting circuit is small in size and is preferable to be incorporated within a large scale integrated circuit (LSI). Similar elements to the elements in FIG. 1 are designated by the same references and the descriptions are omitted. A clock of 19.2 MHz is divided by a divider 51 into a clock "clk" of 384 KHz which is input to a register 52 for registering the IF signal. The register has 32 stages, for example. The series of coefficients for detecting UW, CI, DATA1 and DATA2 are stored in a coefficient register 54. A multiplexer MUX1 is connected to the register 54 for selectively outputting the coefficient sequence. A DATA2 flag register 56, UW flag register 63, CI flag register 65, DATA1 flag register 66 are connected to the multiplexer MUX1 for controlling the multiplexer.

The complex matched filter includes a plurality of multiplication circuits $53_1$ to $53_2$ for multiplying data in the register 52 by the selected data in the register 54. The outputs of the multiplication circuits are summed by an analog adder 57 for generating the correlation yI and yQ. An absolute circuit 58 is connected to the adder 57 for calculating an analog absolute value of yI and yQ, as shown in the formula (17). The absolute value is input to an analog judgment circuit 62. Threshold values for detecting UW, CI, DATA1 and DATA2 are stored in a digital threshold register 59. A multiplexer MUX2 is connected to the register 59 for selectively outputting one of the threshold values. The threshold values are converted into analog values by a digital/analog (D/A) converter 61. The judgment circuit 62 compares the absolute value of the matched filter output from the D/A converter 61. The multiplexer MUX2 is controlled by the same signal as the signal for MUX1. The output of the judgment circuit 62 is parallelly input to the registers 63, 65 and 66, a UW counter 64, and a DATA2 flag register 67. The register 63 stores a UW flag generated by the circuit 62 when the absolute value for detecting UW is higher than the threshold. The counter 64 counts the number of continuous times that UW is not detected. The register 65 stores a CI flag generated by the circuit 62 when CI is detected. The register 66 stores a DATA1 flag generated by the circuit 62 when DATA1 is detected. The register 66 stores a DATA2 flag generated by the circuit 62 when DATA2 is detected. The counter 64 generates a start signal "1" for restarting synchronization when the counted number is equal to a threshold.

A start signal generating circuit 68 is connected to the registers 63, 65, 66 and 67 for generating a start signal "2", as a control signal for the TDMA control circuit 3 and the CPU. A saving signal generating circuit 69 is connected to the registers 63, 65, 66 and 67 and the counter 64 for generating a saving signal for causing other circuits other than the waiting circuit 10 to enter a sleep mode.

Since the matched filter is a complex matched filter, the register 52 has two registers for in-phase and quadrature components, respectively.

Figure 4:
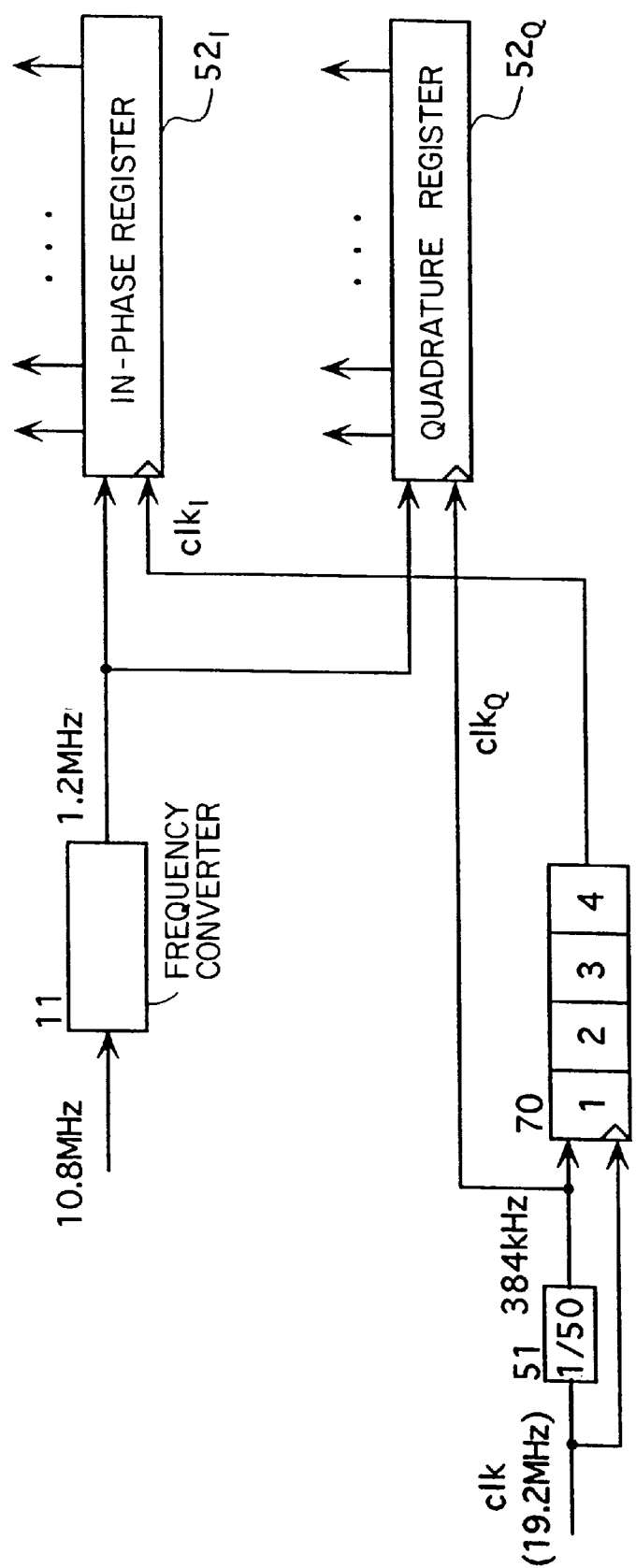
FIG. 4 is a block diagram of a register, of received signal in the circuit of FIG. 3.

As shown in FIG. 4 of a block diagram of the register 52, there are two registers 52I and 52Q for in-phase and quadrature components, respectively. The clock "clk" of 19.2 MHz is divided to be 382 KHz by a clock divider 51, and is used as the sampling clock clkQ of the register 52Q for the quadrature component. The clkQ is delayed by a time of 4 clock periods of 19.2 MHz clock. The delayed clock is used as the sampling clock clkI of the register 52I. The calculation of the equations (7) and (8) are realized by this clock offset, because 4 clock periods is equal to the following time.

$$\frac{1}{19.2\,\text{MHz}} \times 4 = \frac{1}{4.8\,\text{MNz}} = \frac{1}{4 f_{IF}} = \frac{1}{4 \times 1.2\,\text{MHz}}.$$

Figure 5:
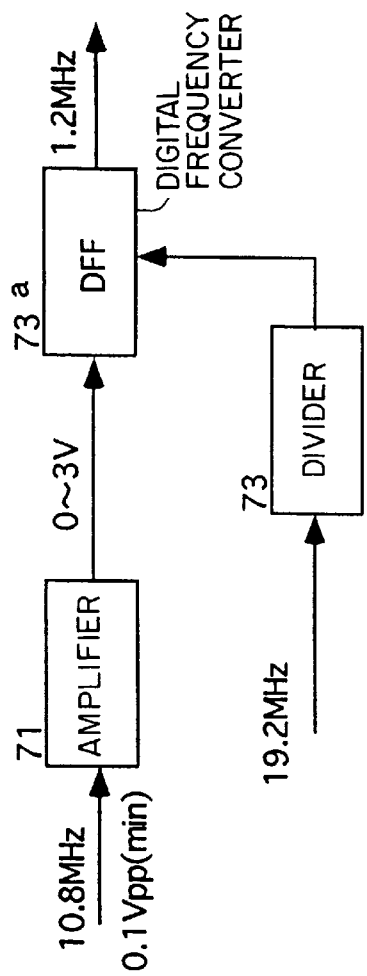
FIG. 5(a) is a block diagram of a frequency conversion circuit in the circuit of FIG. 3.
FIG. 5(b) is a circuit diagram of an amplifier in the circuit of FIG. 5.
Figure 5:
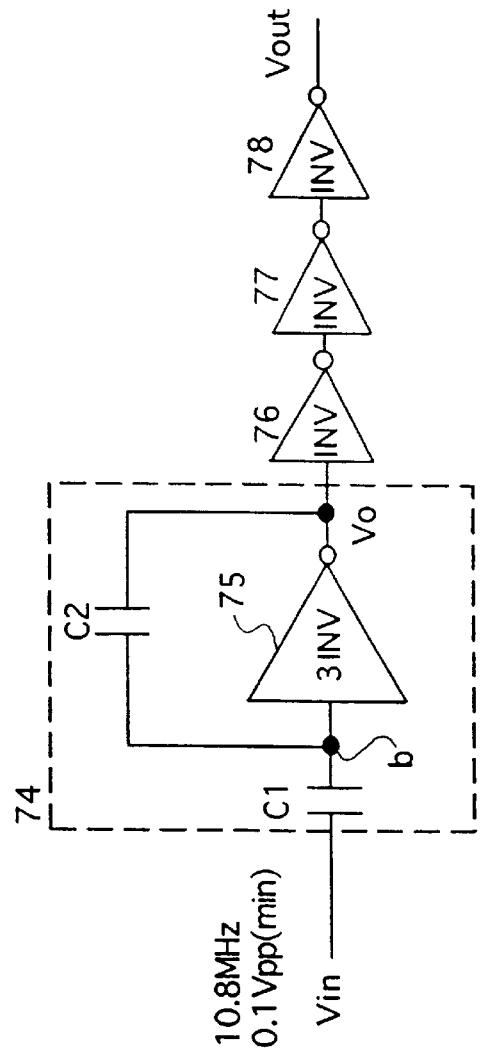

In FIG. 5(*a*), the frequency conversion circuit 11 has an amplifier 71 for amplifying the intermediate frequency signal from the receiver 11. The clock of 19.2 MHz is input to a divider 73 for dividing the clock by 2. A digital frequency converter 73a is connected to the amplifier 71 and the divider 73. The digital frequency converter 73a converts the signal from the amplifier into a signal of 1.2 MHz by the signal of 9.6 MHz from the divider 73.

The amplifier 71 is an analog amplifier as shown in FIG. 5(*b*). The amplifier 71 has an analog amplifying circuit 74 which includes an inverting amplifier 75 having three inverters serially connected. An input capacitance C1 is connected to an input of the inverting amplifier 75, and a feedback capacitance C2 is connected to the inverting amplifier at its input and output. Three inverters 76,77 and 78 are serially connected to an output of the analog amplifying circuit. 74. The capacity ratio of C1 and C2 is C1:C2=5:1, so the amplifying circuit 74 outputs an output voltage Vo five times of an input voltage Vin.

The inverting amplifier 75 has a sufficiently big gain and its input "b" is a floating point. The principle of capacity preservation can be applied, as in the equation (18). Here, Vb is a voltage at point "b".

$$C1 \cdot (Vin-Vb) + C2 \cdot (Vo-Yb) = 0 \qquad (18)$$

A relationship between Vin and Vo is introduced from the equation (18), as in the equation (19).

$$(Vo - Vb) = \frac{C1}{C2} \cdot (Vin - Vb) \qquad (19)$$

When Vb is set to a predetermined value such as Vdd/2 (Vdd is a supply voltage of the amplifier 75) and Vin and Vo are evaluated in comparison with a reference voltage of Vdd/2, the gain is substantially assumed as (C1/C2). The inverters 76 to 78 are provided for making the output Vo non-inverted, because Vo is an inverted signal.

In FIG. 3, the coefficient register 54 and the threshold register 59 are different circuits. However, these registers can be integrated into one shift-register having a seal input a serial output and a parallel output as shown in FIG. 6.

Figures 6, 7:
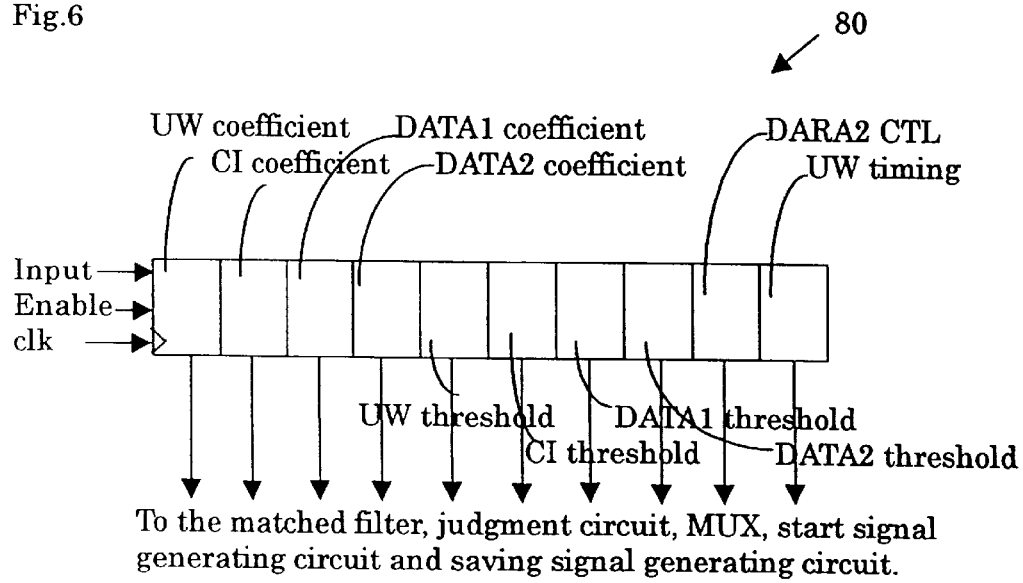
FIG. 6 shows data stored within a shift-register.
FIG. 7 is a truth table of a multiplexer.

In FIG. 6, a shift register 80 which corresponds to both of the registers 54 and 59 is provided, is divided into ten blocks from the first to the tenth. The first to fourth correspond to the register 54 for storing the coefficients for UW, CI, DATA1 and DATA2. The fifth to eighth correspond to the register 59 for storing the threshold for UW, CI, DATA1 and DATA2. The ninth block stores one DATA2 control bit of the DATA2 control register 56. The tenth block stores eight bits UW timing signal for determining the time when the saving signal generating circuit 69 detects the UW signal inputted to the circuit 69.

The data of the first to fourth blocks of the register 80 is selectively outputted by the multiplexer MUX1. The data of the fifth to eighth blocks is selectively outputted by the multiplexer MUX2, to the corresponding multiplication circuits in the matched filter. The judgment circuit 62, the start signal "2" generating circuit 68 and the saving signal generating circuit 69. The serial output is used for inspection.

FIG. 7 is a truth table of the multiplexer MUX1. The multiplexer MUX2 works similarly to MUX1, thus its truth table is omitted. In MUX2, "coefficient" is substituted by "threshold".

In FIG. 7, MUX1 outputs the coefficient for UW in the first block of the register 80 when any one of the UW flag register 63, CI flag register 65, DATA1 flag register 66 and DATA2 flag register is "0". When UW flag is set to "1", the coefficient for CI is output. When CI flag is set to "1" in addition to this, the coefficient for DATA1 is output. When the DATA2 control flag, UW flag, CI flag and DATA1 bit are all set to "1", the coefficient for DATA2 is output. Therefore, the coefficient for CI, coefficient for DATA1, coefficient for DATA2 are successively output as the UW flag when CI flag and DATA1 flag are both set to "1." MUX 2 operates in a similar manner.

Figure 8:
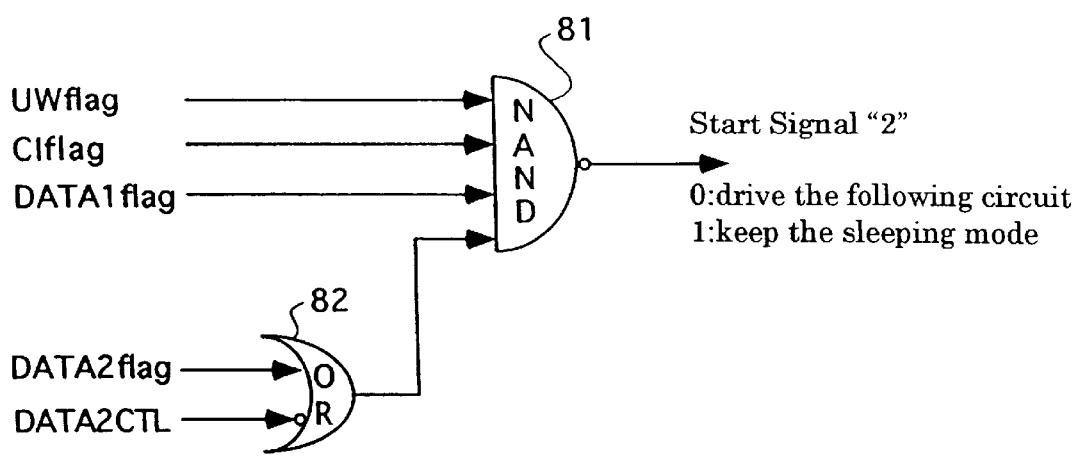
FIG. 8(a) is a circuit diagram of a circuit for generating a start signal.
FIG. 8(b) is a truth table of the circuit in FIG. 8(a).

FIG. 8 shows the start signal "2" generating circuit 68. In FIG. 8(*a*), the U01 flag, CI flag and DATA1 flag are inputted to a NAND gate 81, and the DATA2 flag and the invert of DATA2 control bit are inputted to an OR gate 82. An output of the OR gate 82 is inputted to the NAND gate 81. The start "2" signal is outputted from the NAND gate 81.

A truth table of the start signal "2" generating circuit 68 is shown is FIG. 8(*b*). When all of the UW flag, CI flag, DATA1 flag and DATA2 flag are "1" and the DATA2 control flag is "1", the output of the circuit 68 becomes "0". Circuits following the circuit 68 is driven. When all of the UW flag, CI flag and DATA1 flag are "1" and the DATA2 control flag is "0", an output of the circuit 68 becomes "0". Then, the circuits following to the circuit 68 is driven. If the output of the NAND gate 81 is "1", so the following circuit remains in the sleep mode.

Figure 9:
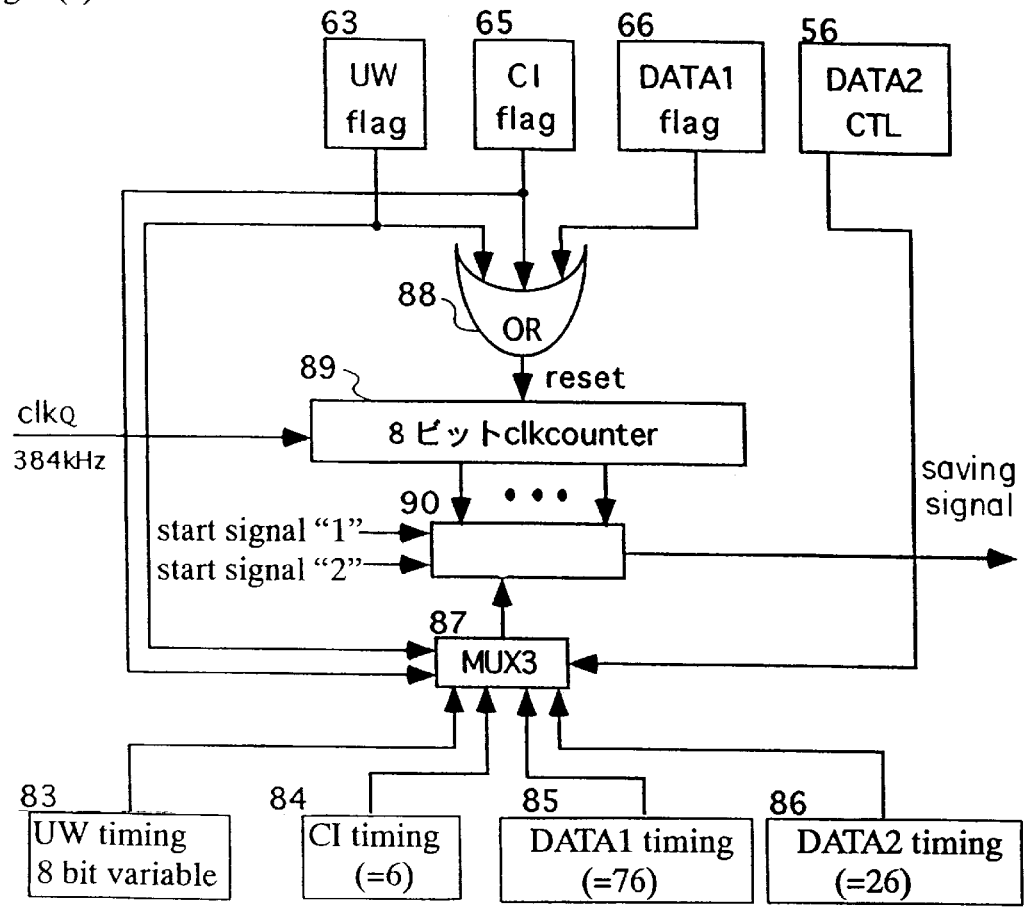
FIG. 9(a) is a circuit diagram of a circuit for generating a saving signal.
FIG. 9(b) is a truth table of the circuit in FIG. 9(a).

FIG. 9(*a*) shows the saving signal generating circuit 69, which includes the UW flag register 63, CI flag register 65 and DATA1 flag register 66. The DATA2 control flag stored in the register 80 is represented by a reference number "56". Register "83" is a 8 bits UW timing register for storing the UW timing data, Register "84" is a CI timing register for storing a CI timing data which is set to be "6" in the figure, Register "85" is a DATA1 timing register storing a DATA1 timing date which equals "76". Register"86" is a DATA2 timing register for storing a DATA2 timing data which equals "26". Outputs of the timing registers 83 to 86 are selected by a multiplexer MUX3 in response to the status of the flag registers 63 and 65 and the DATA2 control flag 56. The clock clkI is input to a 8 bits clock counter 89 for counting clkI. The timing data is input through a multiplexer 87 to a logic circuit 90 which receives a counting value of the counter 89 and the start signals "1" and "2". The circuit 90 outputs a saving signal.

FIG. 9(*b*) is a truth table of the logic circuit 90. When one of start signals "1" and "2" is "1" and circuits than the waiting circuit arc not working, the saving signal is "0" causing the power supply to the waiting circuit to cease. When both of start signals "1" and "2" are "1" and one or more of UW, CI, DATA1 and DATA2 is not detected in a predetermined time period, and the saving signal is "0" the waiting circuit enters a sleep mode.

When the power source is "ON" for the analog portions, MUX3 selects the data in the UW timing register 83. It is input to the logic circuit 90 causing the circuit to wait for the UW signal.

A outside saving signal engages the power supply of the frequency conversion circuit 11, the adder 57, receiver 1 and other analog portions 0.375 msec before the of UW signal begins. The UW timing data of 188=0.375/(1/384)+32+12 includes a redundancy of ±1/32 kHz timing error which is set in the register 83. The setting is performed at the staff up of the portable terminal.

The clock counter 89 counts the 384 KHz clock for the I channel until the count value is equal to the UW timing data "188," unless the output of the UW flag register becomes "1" causing the saving signal to equals "0" to maintain the sleep mode. When UW flag becomes "1" during the timing, the flag is input through a OR circuit 88 to the counter causing the counter to reset. The multiplexer 87 selects the CI timing register 84 causing that the CI timing data to be inputted to the logic circuit 90 for the waiting CI signal. CI timing data is set to be 6=4+2 with a margin of "2". The clock counter 89 counts the clock until the count value is equal to "6" unless the output of the CI flag register equals "1" so that the saving signal "0" is outputted to maintain the sleep mode. When CI flag becomes "1" during the timing, the flag is input through a OR circuit 88 to the counter causing the counter to reset. The multiplexer 87 selects the DATA1 timing register 85 causing the DATA1 timing data to be inputted to the logic circuit 90 for the waiting DATA1 signal. DATA1 timing data is set to be 76=42+32+2 with a margin of "2".

The clock counter 89 counts the clock until the count value is equal to "76" unless the output of the DATA1 flag register becomes "1" causing the saving signal equal to "0" is outputted to maintain the sleep mode. When DATA1 flag equals "1" during the timing, the flag is input through a OR circuit 88 to the counter to reset the counter. When DATA2 control bit is "0", the start signal "2" becomes "0" and the waiting circuit is stopped causing the power to be supplied to other circuits. When DATA2 control bit is "1", the multiplexer 87 selects the DATA2 timing register 86 causing the DATA2 timing data to be inputted to the logic circuit 90 for the waiting DATA2 signal. DATA2 timing data is set to be 26=24+2 with a margin of "2".

The clock counter 89 count the clock until the count value is equal to "26" unless the output of the DATA2 flag register becomes "1" causing the saving signal to equal "0" is outputted to maintain the sleep mode. When DATA2 flag becomes "1" during the timing, the DATA2 flag becomes "1" and the start signal "2" becomes "0" The waiting circuit is stopped and power is supplied to the other circuits.

Figure 10:
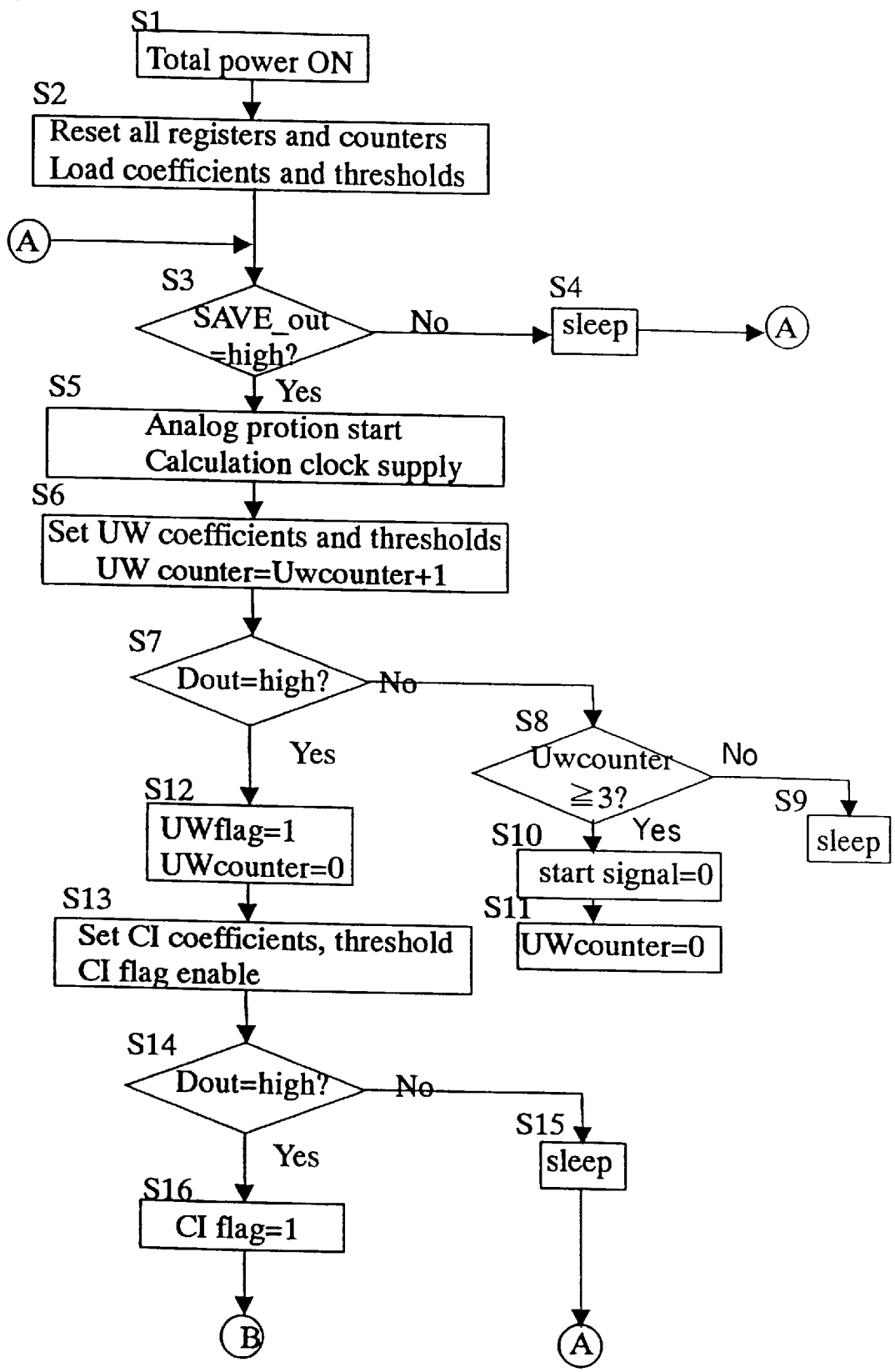
FIG. 10 is a flow chart of the circuit in FIG. 3.
Figure 11:
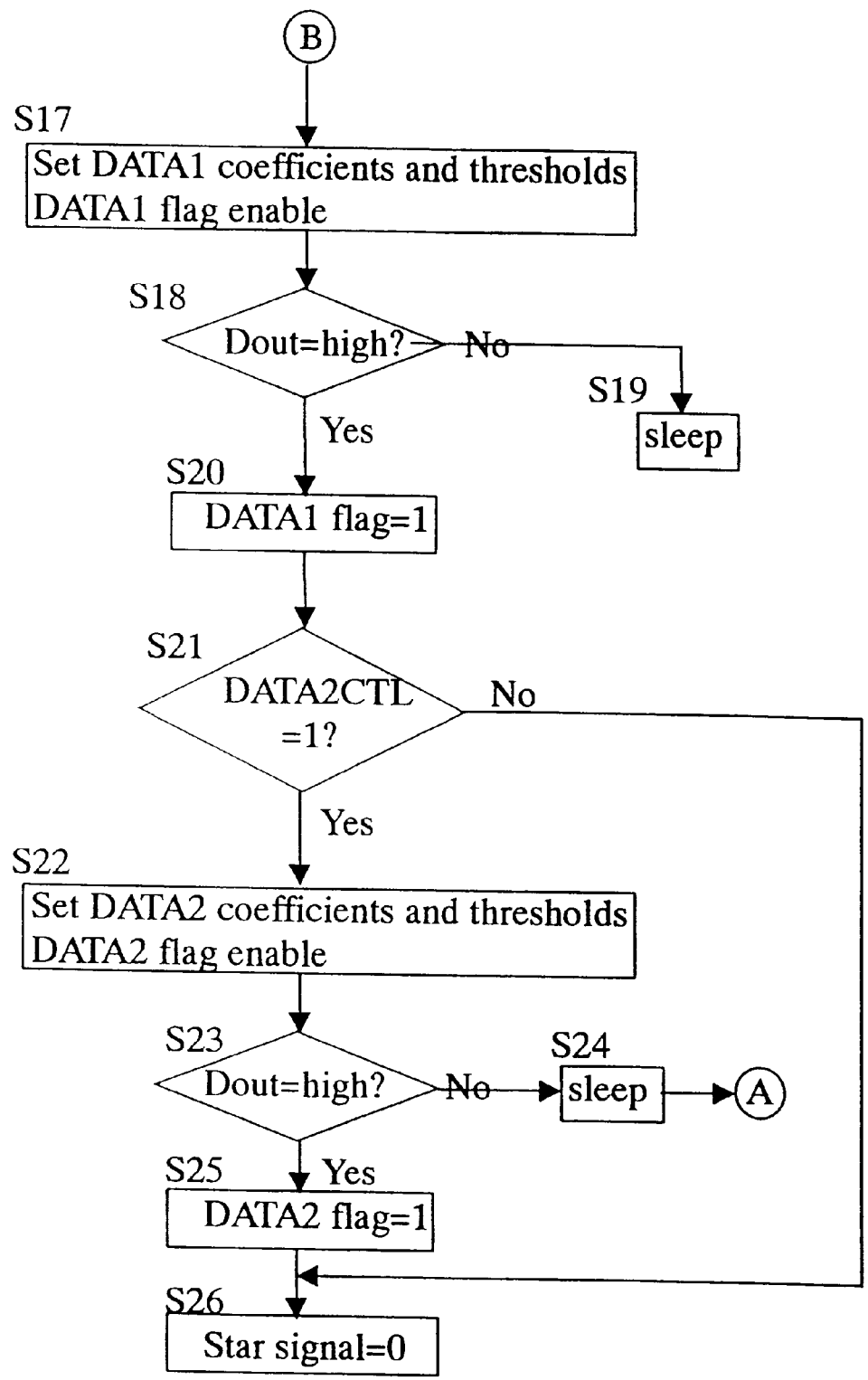
FIG. 11 is a flow chart following to that in FIG. 3.
Figure 12:
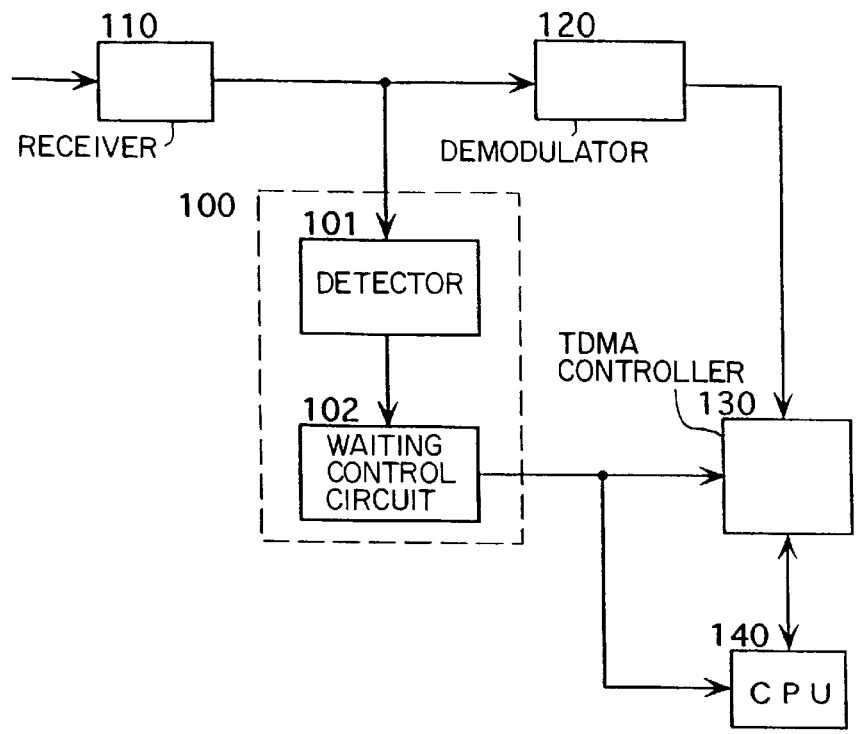
FIG. 12 is block diagram of a conventional portable terminal.
Figure 13:
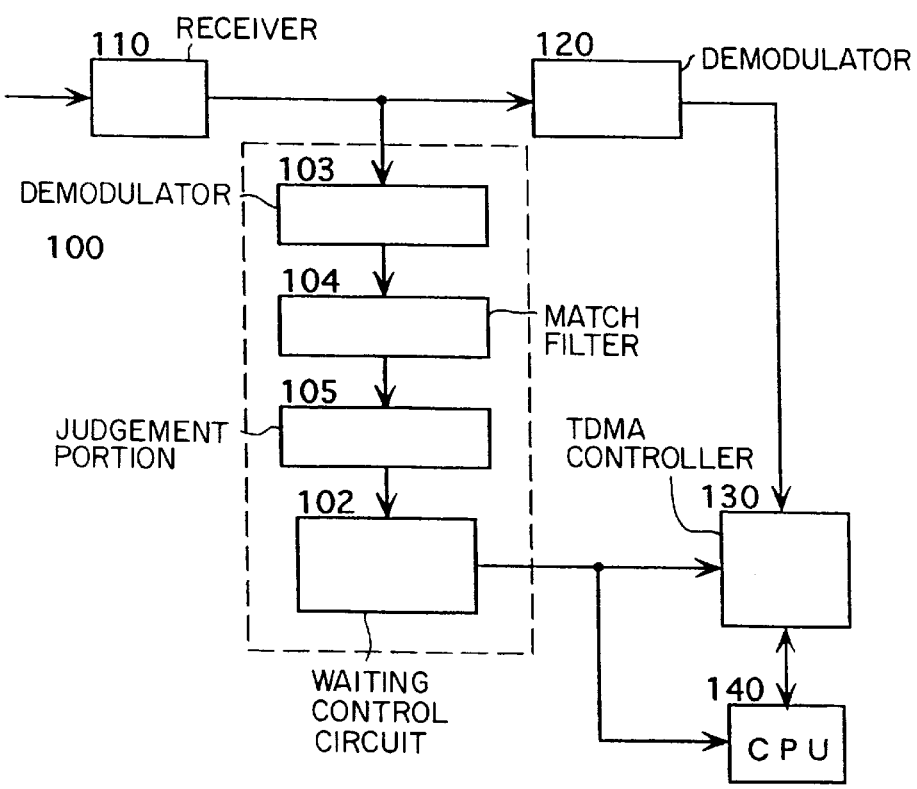
FIG. 13 is a block diagram of a conventional waiting circuit.

FIGS. 10 and 11 show a flow chart of the waiting circuit. First the total power supply is inputted (Step S1). At step S2, the initial condition is set, all of the counters are reset and the coefficients and thresholds are loaded.

At the step S3, it is determined whether the outside saving signal is "1" (high) or not. This signal is constantly and intermittently, for example every 1.2 seconds, input to the waiting circuit 10 from the outside. When the signal is "0"(low), the step S4 is executed placing the terminal in sleep mode. The analog portions such as the frequency conversion circuit 11 and adder 57 are cut off from the power source, and the divider 51 is stopped. The digital portion are connected to the power source, however the power consumption is reduced because the clock signal is stopped.

When the outside saving signal is "1" and the judgment in the step S3 is "Yes", the step S5 is executed. The analog portions are connected to the power source and the divider 51 is started working. Then, the clock of 384 kHz is supplied to the register 52 causing the IF signal to be sampled in response to the 384 kHz (192×2 kHz) clock and successively inputted to the register 52.

At the step S6, the multiplexer 55 is controlled to set the coefficients for UW. The multiplexer 60 is controlled to set the threshold for UW through the D/A converter 61 to the judgment circuit 62.

The UW counter is increased by one. The complex matched filter multiplies at the multiplication circuits $53_1$, to $53_{32}$ the outputs from the register 52 and the coefficients for UW. The adder 575 outputs the total summation yI and yQ, respectively, and the absolute circuit 58 outputs the absolute value of yI and yQ. The judgment circuit 62 compares the absolute value with the threshold selected at the step S6. When the absolute value is bigger than the threshold, the output Dout becomes high.

At the step S7, the output Dout is judged whether it is high or not. When it is not high it is determined whether the counting value of the UW counter 64 is less than "3" at the step S8. When the counting value is 2 or less, the sleep mode is started at the step S9. When 3 or more, the start signal "1" is set to "0" at the step S10, and the counter 64 is reset at the step S11. When the start signal "1" is "0", the synchronization is performed and the saving signal becomes "0" causing the waiting circuit to go into the sleep mode.

When Dout is high and the judgment at the step S7 is "Yes", UW flag register 63 is set to "1"60 and the UW counter 64 is reset.

At the step S13, the first and second multiplexers are controlled so that the coefficients for C1 are set to the matched filter and the threshold for CI is set in the judgment circuit 58. The matched filter calculates correlation of the received signal with the C1 signal. The CI flag register 65 becomes enable status.

At the step S14, it is determined whether the output Dout is high or not. When the judgment is "No", the sleep mode is started in the step S15. When "Yes". C1 flag is set to be "1" at the step S16.

At the step S17 in. FIG. 11, the multiplexers MUX1 and MUX2 are controlled causing the coefficients for DATA1 to be set in the matched filter and the threshold for DATA1 is set in the judgment circuit 66. The DATA1 flag register becomes enable status.

Similarly to the above, the absolute value of the correlation of the coefficients for DATA1 and the received signal is compared with the threshold by the judgment circuit 62 at the step S20. The output Dout of the circuit 62 is determined whether it is high or not. When the judgment is "No", the sleep mode is started because DATA1 is not detected.

When the judgment at the step S18 is "Yes", DATA1 flag is set to be "1" at the step S20. At the step S21, it is determined whether the DATA2 control bit 56 is "1" or "0". When it is "0", the start signal "2" becomes "0" causing the other circuits other than the waiting circuit to be supplied with the power.

When the DATA2 control bit 56 is "1", MUX1 and MUX 2 are controlled causing the coefficients for DATA2 to be set in the matched filter and the threshold for DATA2 to be set in the judgment circuit 62 at the step S22. The DATA2 flag register 67 becomes enable status. The output Dout judged whether it is high or not by the judgment circuit 62 at the step S23.

When the judgment at the step S22 is "No", the sleep mode is started at the step S24 because DATA2 is not detected. When "Yes", the DATA2 flag register 67 is set at the step S25 because DATA2 is detected. At the step S26, the start signal "2" becomes "0".

As mentioned above, the signal UFW, CI, DATA1 and DATA2 are successively detected by only one matched filter. Thus, the circuit is small when compared to the conventional circuit.

Although, the above embodiment are applied to a PHS system, the waiting circuit of this invention is applicable to any other communication systems.

What is claimed is:

1. A waiting circuit incorporated within a portable terminal of a mobile communication system, for detecting a predetermined signal from a base station to start other circuits which are in a sleep mode, said predetermined signal being generated in said base station having a speed corresponding to a predetermined symbol rate, said predetermined signal being modulated in said base station to be an intermediate frequency signal having a frequency higher than a frequency of said symbol rate, comprising:

a sub-sampling circuit for sampling said intermediate frequency signal in response to a sampling clock having a speed equal to an integer times said symbol rate;

a matched filter for multiplying said sampled intermediate frequency signal by a predetermined sequence of coefficients corresponding to said intermediate frequency signal, and producing a produces a matched filter signal; and a control circuit for starting said other circuits when said matched filter signal indicates that said predetermined signal is received.

2. The waiting circuit as claimed in claim 1, wherein said predetermined signal comprises a UW signal for establishing a word synchronization of a burst signal, a CI signal for identifying said portable terminal, a DATA1 signal identifying a service type; and sequences of coefficients for detecting UW, CI or DATA1 are selectively input to said matched filter.

3. The waiting circuit as claimed in claim 2, further comprising a judgment circuit which successively performs detection of said UW, CI and DATA1 signals until none of said UW, CI or DATA1 signal is detected.

4. The waiting circuit as claimed in claim 2, wherein said predetermined signal further comprises a DATA2 signal which includes additional information, and is detectable after DATA1 is detected.

5. A waiting circuit incorporated within a portable terminal of a mobile communication system, for detecting a predetermined signal from a base station to start other circuit which are in a sleep mode, said predetermined signal being generated in said base station having a speed corresponding to a predetermined symbol rate, said predetermined signal being step-wisely modulated in said base station to be a plurality of intermediate frequency signals being step-wisely higher one after another, an intermediate frequency signal of a final step being modulated by a carrier signal, said waiting circuit comprising:

a frequency conversion circuit for converting a received signal having a carrier wave frequency into an intermediate frequency signal having the lowest frequency of said plurality intermediate frequency signals;

a sub-sampling circuit for sampling said intermediate frequency signal having said lowest frequency in response to a sampling clock having a speed equal to an integer times said symbol rate;

a matched filter for multiplying said sampled intermediate frequency signal by a predetermined sequence of coefficients corresponding to said intermediate frequency signal having the lowest frequency, and producing a matched filter signal; and a control circuit for starting said other circuits when said matched filter signal indicates that said predetermined signal is received.

6. The waiting circuit as claimed in claim 5, wherein there are two intermediate frequency signals.

7. The waiting circuit as claimed in claim 6, wherein said frequency conversion circuit hard-limits said received signal to generate a signal similar to a binary signal.

8. The waiting circuit as claimed in claim 2, wherein:

said predetermined signal comprises a UW signal for establishing a word synchronization of a burst signal, a CI signal for identifying said portable terminal, a DATA1 signal identifying a service type; and sequences of coefficients for detecting UW, CI or DATA1 are selectively input to said matched filter.

9. The waiting circuit as claimed in claim 8, further comprising a judgment circuit which successively performs detection of said UW, CI and DATA1 signals until none of said UW, CI or DATA1 signal is detected.

10. The waiting circuit as claimed in claim 9, wherein said predetermined signal further comprises a DATA2 signal which includes additional information and is detectable after DATA1 is detected.

11. A waiting circuit incorporated within a portable terminal of a mobile communication system, for detecting a predetermined signal from a base station to start other circuits which are in a sleep mode, said predetermined signal being generated in said base station having a speed corresponding to a predetermined signal rate, and is quadratically modulated in said base station into in-phase and quadrature phase components, each of said components being step-wisely modulated in said base station to be a plurality of intermediate frequency signals being step-wisely higher one after another, an intermediate frequency signal of a final step being modulated by a carrier signal, said waiting circuit comprising:

a frequency conversion circuit for converting a received signal having a carrier wave frequency into an intermediate frequency signal having the lowest frequency of said plurality of intermediate frequency signals;

a sub-sampling circuit for sampling said intermediate frequency signal having said lowest frequency in response to two phase sampling clocks each having a speed equal to an integer times said symbol rate, wherein each of said two phase sampling clocks are shifted from each other by a quarter of a cycle of said lowest intermediate frequency;

a complex matched filter for multiplying said sampled intermediate frequency signals of both of said sampling clocks by a predetermined sequence of coefficients corresponding to said intermediate frequency signal having said lowest frequency, and producing a complex matched filter signal; and a control circuit for starting said other circuits when said complex matched filter signal indicates that said predetermined signal is received.

12. The waiting circuit as claimed in claim 3, wherein there are two intermediate frequency signals.

13. The waiting circuit as claimed in claim 9, wherein said frequency conversion circuit hard-limits said received signal to generate a signal similar to a binary signal.

14. The waiting circuit as claimed in claim 11, wherein:

said predetermined signal comprises a UW signal for establishing a word synchronization of a burst signal, a CI signal for identifying said portable terminal, a DATA1 signal identifying a service type; and sequences of coefficients for detecting UW, CI or DATA1 are selectively input to said complex matched filter.

15. The waiting circuit as claimed in claim 14, further comprising a judgment circuit which successively performs detection of said UW, CI and DATA1 signals until none of said UW, CI or DATA1 signal is detected.

16. The waiting circuit as claimed in claim 15, wherein said predetermined signal further comprises a DATA2 signal which includes additional information and is detectable after DATA1 is detected.

* * * * *